United States Patent [19]
Wilson

[11] Patent Number: 6,021,376
[45] Date of Patent: Feb. 1, 2000

[54] METHOD OF DISPLAYING CONNECTIONS IN THE FIELD BETWEEN LIKE GEOGRAPHICAL FEATURES

[75] Inventor: Mark Edward Wilson, Sunnyvale, Calif.

[73] Assignee: Trimble Navigation Limited, Sunnyvale, Calif.

[21] Appl. No.: 09/121,489

[22] Filed: Jul. 23, 1998

[51] Int. Cl.[7] .................................................. G06F 19/00
[52] U.S. Cl. .......................................... 702/5; 342/357.17
[58] Field of Search ..................... 702/2, 5, 16; 701/213,
701/208; 342/357.17, 357.13, 357.12, 357.08,
357.06

[56] References Cited

U.S. PATENT DOCUMENTS

| | | | |
|---|---|---|---|
| 5,379,045 | 1/1995 | Gilbert et al. | 342/357.08 |
| 5,528,518 | 6/1996 | Bradshaw et al. | 702/5 |
| 5,684,476 | 11/1997 | Anderson | 701/213 |
| 5,699,244 | 12/1997 | Clark, Jr. et al. | 701/213 |
| 5,731,997 | 3/1998 | Manson et al. | 701/213 |
| 5,737,508 | 4/1998 | Feigenbaum | 345/342 |
| 5,831,573 | 11/1998 | Muir | 342/357.17 |
| 5,903,235 | 5/1999 | Nichols | 342/357.17 |

*Primary Examiner*—Donald E. McElheny, Jr.
*Attorney, Agent, or Firm*—David R. Gildea

[57] ABSTRACT

A data recorder and method for automatically displaying connections between feature icons as like features are recorded in the field. In setup, feature codes for identifying features of interest are entered and stored. In field operation, geographical features are recorded by entering the feature codes and either entering geographical locations for the features through a keypad or receiving the locations through an I/O interface from a location apparatus. A display shows the features as icons at points having geometrical relationships corresponding to the geographical relationships of features. During the field operation, a microprocessor executes instructions in a line update program for display a line from the icon for each newly recorded feature as it is recorded to the icon for the last previously recorded feature having the same feature code, and from there to the second last previously recorded feature having the same feature code and so on, so that all the icons representing features having the same feature code are connected.

14 Claims, 4 Drawing Sheets

METHOD OF DISPLAYING CONNECTIONS IN THE FIELD BETWEEN LIKE GEOGRAPHICAL FEATURES

BACKGROUND OF THE INVENTION

1. Field of the Invention

The invention relates generally to geographical feature coding and more particularly to a data recorder and method for automatically displaying connecting lines between feature icons representing like features in real-time as the features are recorded in the field.

2. Description of the Prior Art

Handheld data recorders are used by surveyors in the field for recording geographical locations of features such as trees, power poles, points along fences, or the like. In operation, the surveyor walks or drives to a feature that is of interest, determines the geographical location of the feature, and then uses the data recorder for recording the location and a code for the feature was found at that location. Historically, the surveyor records the feature by entering a code that he has previously setup, such as TREE for a tree or FCE for a point along a fence and associates the feature with a location either manually or through a digital interface from a separate survey apparatus. Existing data recorders have a display for showing icons at points on the display for representing the geographical relationships of the locations of the features. Typically, the surveyor will record several features in this way in the data recorder and then go back to an office for post-processing the feature recordings with a personal computer or work station in order to perform whatever computations are needed. One of the limitations of the data recorders that exist is that there is no provision for visually connecting the icons as the features are recorded in the field. Such visual presentation of feature connections is not available to the surveyor until he post-processes his feature records back at an office. Having no visual connections, it is difficult for the surveyor to notice when features are missed, incorrectly located, or incorrectly encoded during the survey.

There is a need for a handheld data recorder for a surveying applications for showing visual connections of feature icons while a surveyor is recording features in the field.

SUMMARY OF THE INVENTION

It is therefore an object of the present invention to provide a method and apparatus for displaying lines between feature icons in real-time as a surveyor is recording map features and their locations.

Briefly, in a preferred embodiment, the present invention includes a handheld data recorder having a keypad, an I/O interface, a display, a microprocessor, a data memory, and a program memory including a line update program. In setup, feature codes for identifying features of interest are entered through the keypad and stored in the data memory. In field operation the features are recorded by entering the feature codes through the keypad and either entering geographical locations for the features through the keypad or receiving the locations through the I/O interface from a location apparatus; and then stored in the data memory for downloading and post processing with an office computer at a later time. The display shows the features as icons at points having geometrical relationships corresponding to the geographical relationships of features. During the field operation in the present invention, the microprocessor executes the line update program for visually showing a line from the icon for each newly recorded feature to the icon for the last previously recorded feature having the same feature code, and from there to the second last previously recorded feature having the same feature code and so on, so that all the icons representing features having the same feature code may be connected.

An advantage of the present invention is that an operator can detect when features are missed, incorrectly located, or incorrectly encoded during the survey without waiting until the recorded data is post-processed with an office computer.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
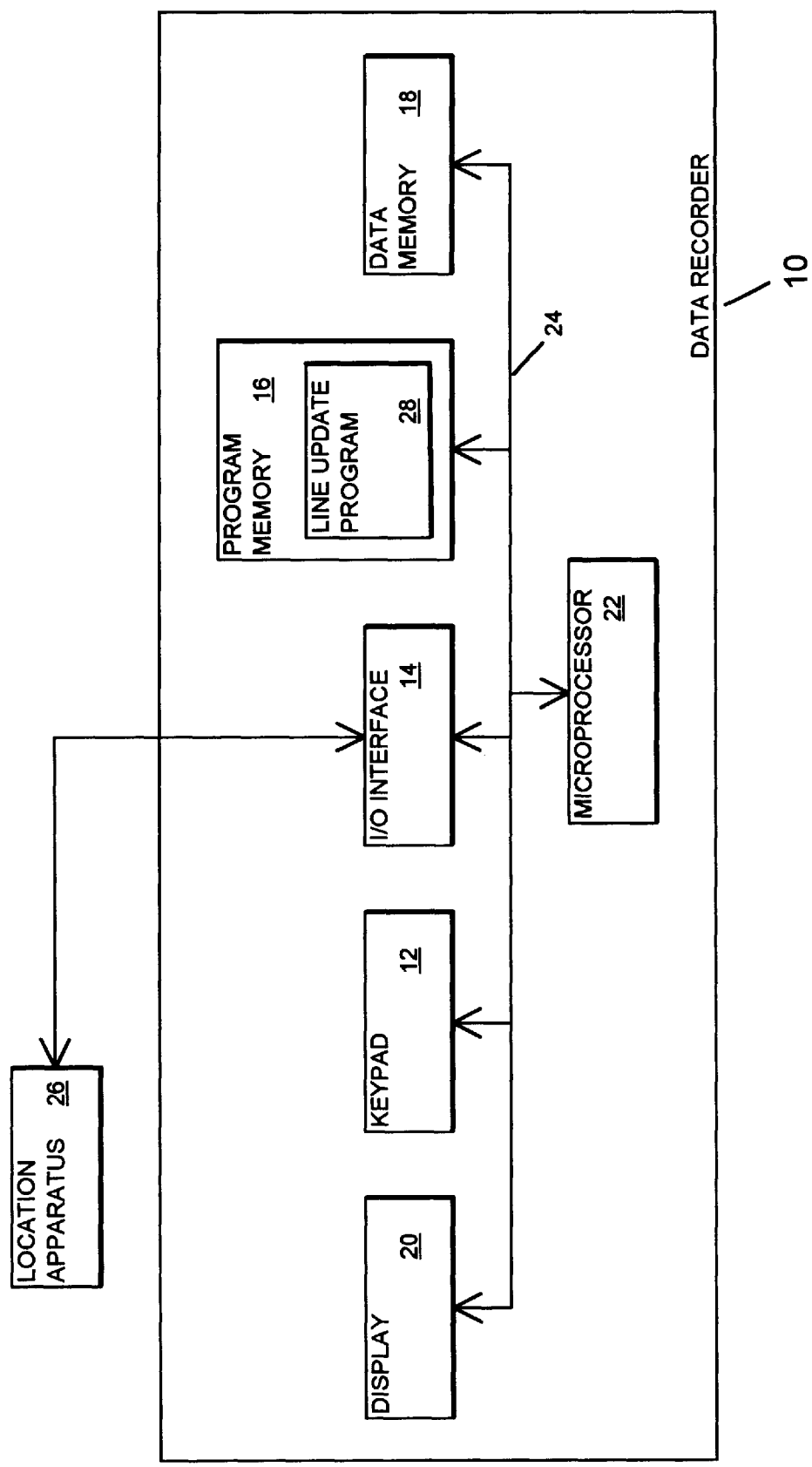
FIG. 1 is a block diagram of a data recorder of the present invention.

FIG. 1 is a block diagram of a data recorder of the present invention referred to by the general reference number 10 for recording geographical features. The data recorder 10 includes a keypad 12 for receiving entries from an operator, an input/output (I/O) interface 14 for receiving and issuing digital interface signals, a program memory 16 for storing executable programs, a data memory 18 for storing variable data, a display 20 for displaying information in a form that is viewable by an operator, and a microprocessor 22. The microprocessor 22 operates over a bus 24 using the program memory 16 and data memory 18 in a conventional manner for receiving information from the keypad 12 and operating the I/O interface 14 and the display 20.

During setup, the operator uses the keypad 12 for selecting and defining alphanumeric feature codes and action codes as shown in tables 1 and 2 and described below in the detailed description accompanying FIG. 2. The feature codes and the action codes are then stored in a library list in the data memory 18. The feature codes are used for identifying physical features, such as a trees identified with letters "TREE", points along a fence identified with letters "FCE", and the like. Particular actions defined with the feature codes and the action codes are used for determining the way in which the features that are identified by associated feature codes are shown on the display 20. In field operation, a feature is recorded in a feature record and stored in the data memory 18 when the feature code for that feature is entered through the keypad 12 and information for an associated geographical location is entered through the keypad 12 or received through the I/O interface 14 from a location apparatus 26. Each feature record is either automatically or manually identified by a name or number that is unique to that record. Typically, the numbers given to the feature records are sequential.

Preferably, the location apparatus 26 is a global positioning system (GPS) surveyor apparatus including a GPS receiver for receiving a GPS signal and a radio for receiving GPS reference information including GPS carrier phase observables or differential GPS (DGPS) corrections in real time for a reference GPS station. The GPS receiver compares its own observations of the GPS signal with the GPS reference information for precisely determining its own location. Several such GPS surveyor apparatus and GPS reference stations are commercially available from several vendors including Trimble Navigation Limited of Sunnyvale, Calif. During the operation, the display 20 shows icons at display points having a geometrical relationships corresponding to the geographical relationships of the features that have been recorded and stored.

The program memory 16 includes a line update program 28. As each feature is recorded, the microprocessor 22 executes instructions in the line update program 28 for controlling the display 20 for showing visual connecting lines between the icons according to the feature code and the action code that is recorded. For example, an icon for each newly recorded feature may be connected to the icon for the last recorded feature having a like feature code, and from there to the second last recorded feature having a like feature code and so on, thereby visually connecting all of the icons for the same feature code with a continuous line.

Figure 2:
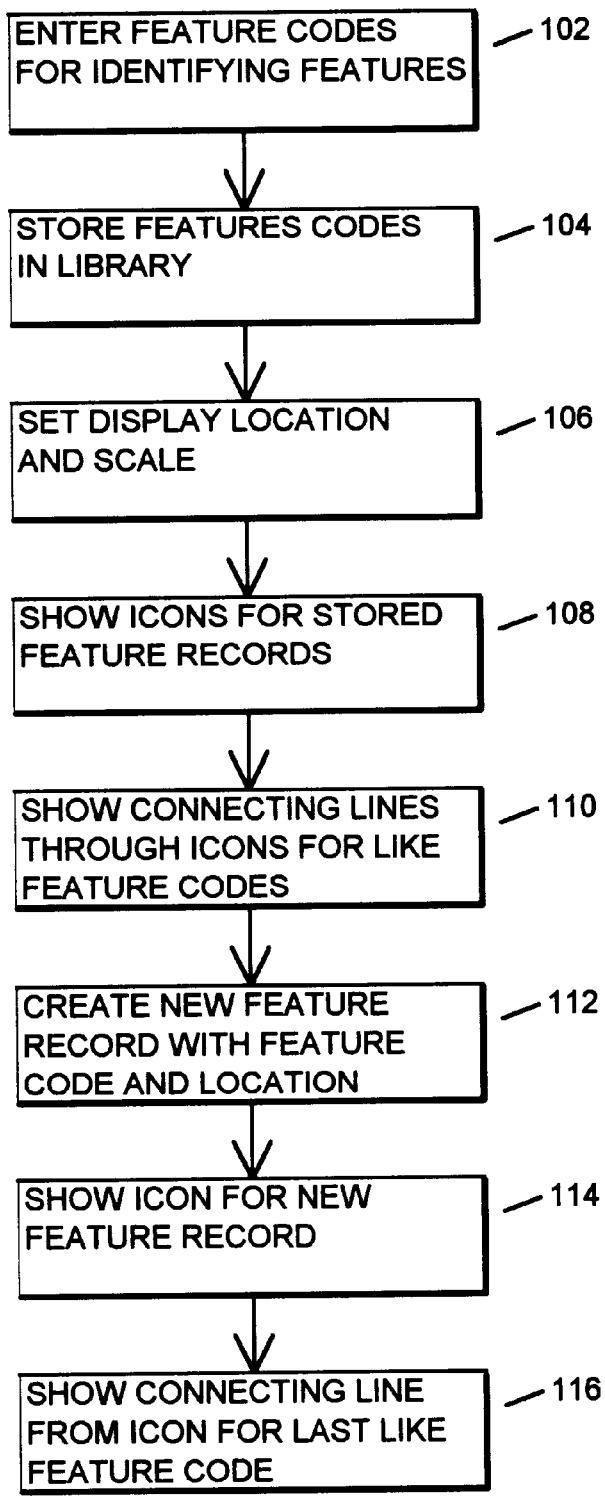
FIG. 2 is a flow chart of a method of operation for displaying connections between like features in the field with the data recorder of FIG. 1.

FIG. 2 is a flow chart of the operation of the data recorder 10 for mapping geographical features. In a step 102 the operator defines the alphanumeric feature codes and action codes that are appropriate for identifying and displaying the features of interest during his mapping operation. Typically, the operator will select short words or abbreviations for the feature codes such as TREE for a tree, FCE for a point along a fence, PPOLE for a power pole, LAMP for a street lamp, HEDGE for a point along a fence, PATH for a point along a path, and the like. The definition of each feature code may include one of the actions on the list shown in Table 1 below.

Join to previous (any code)
Join to previous (same code)

TABLE 1

Referring to the table 1, the "join to previous (any code)" action instructs the line update program 28 to connect the display point for a new (present) feature record to the display point for the most recent previous feature record that was recorded regardless of whether the present feature record and the most recent previous feature record have the same feature code. The "join to previous (same code)" action instructs the line update program 28 to connect the display point for the present feature record to the display point for the most recent previous feature record having the same feature code. Thus, for example, if the feature code FCE is defined to have the "join to previous (same code)" action, then all the points recorded with the FCE feature code will be joined by the line update program 28 in the order in which they were recorded.

The action codes listed in table 2 below instruct the line update program 28 for performing actions that are exceptions to the actions defined above for the feature codes.

Join to first (same code)
Join to named point
Start join sequence
Skip join

TABLE 2

Typically, the operator will select short words or abbreviations for the action codes such as CLOSE or CLS for "join to first (same code)", JPT for "join to named point", START or ST for "start join sequence", and SKIP for "skip join". Referring to the table 2, the "join to first (same code)" action code instructs the line update program 28 to connect the display point for a new (present) feature to the first recorded feature having the same feature code. The "join to named point" action code instructs the line update program 28 to connect the display point for a present feature to the existing feature record with a given name. The "start join sequence" action code instructs the line update program 28 to consider the present feature to be the first feature with that feature code. The "skip join" action code instructs the line update program 28 to break the sequence from the most recent previous feature record and restart the sequence so the display point for the present feature record will be connected to the display point for the next feature record having the same feature code when the next feature record having that feature code is recorded.

In a step 104 the feature codes and the associated actions are stored in the library list in the data memory 18. In a step 106 the center point and the scale of the display 20 are set. The center point represents a particular geographical location. A change in the geographical location, either entered through the keypad 12 by the operator or received through the I/O interface 14 from the external location apparatus 26, can cause the display 20 to pan. The scale is entered through the keypad 12 by the operator either directly or using softkeys identified on the display 20 for zoom in and out. In a step 108 the display 20 shows icons for the feature records that have been previously stored in the data memory 18 and are within a display range determined by the center point and the scale. In a step 110 the microprocessor 22 executes instructions in the line update program 28 for causing the display 20 to show the connecting lines through the icons according the to actions and action codes selected from the tables 1 and 2.

In field operation, in a step 112 the operator records a new (present) feature by entering the feature code that identifies the present feature, entering the action code if appropriate, and entering the geographical location of the present feature or an instruction for using the geographical location received through the I/O interface 14 from the location apparatus 26. Optionally, the operator uses the keypad 12 for entering an offset to the geographical location received through the I/O interface 14. The data recorder 10 stores the feature code, the geographical location of the present feature, and the record name in a present feature record. In a step 114 the display 20 shows an icon at a point on the display 20 that represents the geographical location of the present feature.

In a step 116 the microprocessor 22 executes instructions in the line update program 28 for controlling the display 20 for connecting the icon for the present feature record to icons for previous feature records. For example, when a feature code of PPOLE is defined with an action of "join to previous (same code)", a present feature record recorded as PPOLE connects the display point for the present feature record to the display point for the most recent previous feature record having a feature code of PPOLE. Using the examples for the action codes defined for the table 2 above, a present feature record recorded as PPOLE START starts a sequence where the display point for the present feature record will be connected to the display point for the next feature record having the same feature code when the next feature record having the feature code is recorded; a present feature record of PPOLE CLOSE connects the display point for the present feature record to the display point for the feature record recorded as PPOLE START; a present feature record of PPOLE SKIP breaks the sequence from the most recent previous feature record and restarts the sequence so the display point for the present feature record will be connected to the display point for the next feature record having the same feature code when the next feature record having the feature code is recorded; and a present feature record of PPOLE JPT 1001 connects the display point for the present feature record to the display point for the feature record having the name 1001.

Figure 3:
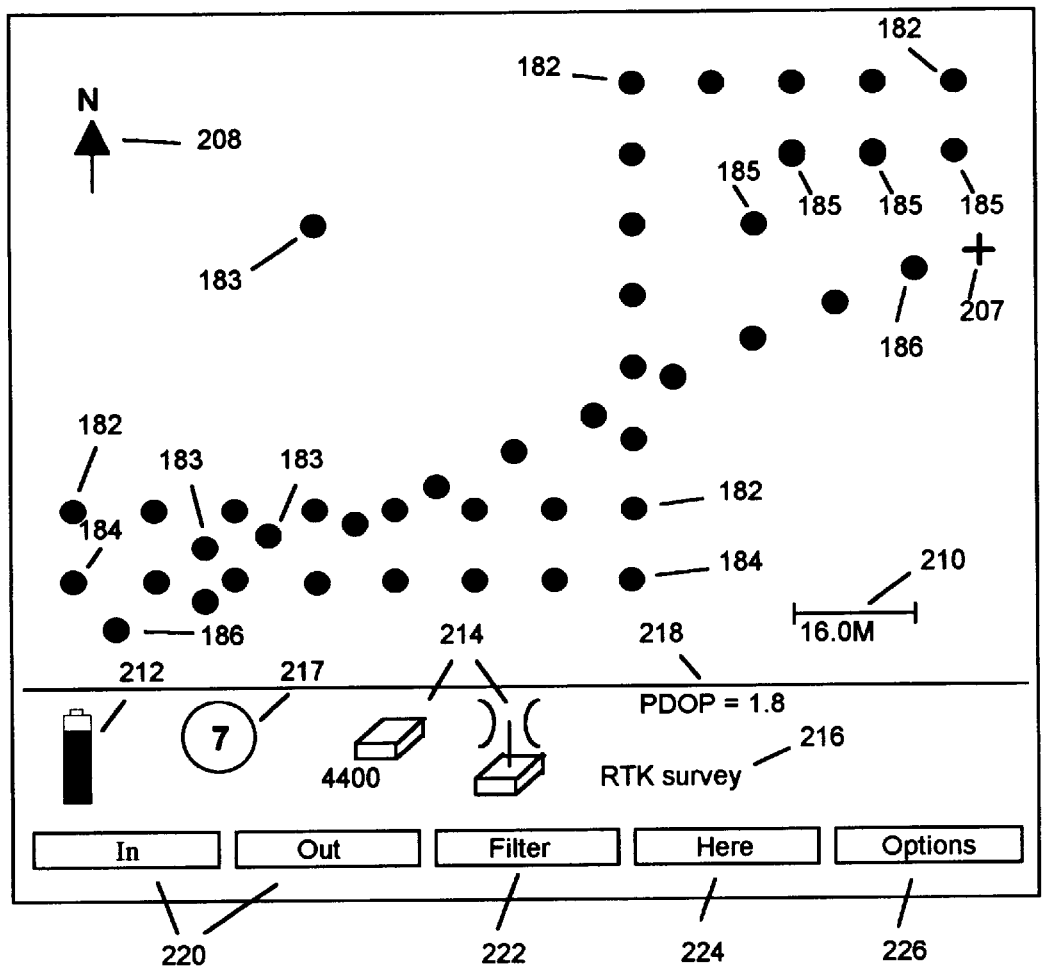
FIG. 3 is a diagram of a display for the data recorder of FIG. 1 without connecting lines between the icons on the display.

FIG. 3 is a drawing of an exemplary visual presentation for the display 20. In FIG. 3, a series of icons 182 in a step pattern represent several locations for a type of feature identified with a first feature code (the corners of the step pattern of the icons 182 are referenced in the FIG. 3); icons 183 represent a type of feature identified with a second feature code; icons 184 represent several locations for a type of feature identified with a third feature code (the ends of a line of the icons 184 are referenced); icons 185 represent several locations of a type of feature identified with the third feature code; and icons 186 in a line represent several locations for a type of feature identified with a fourth feature code (the ends of a line of the icons 186 are referenced). It may be noted that it is not easy for the operator to distinguish one group of features from another using the display 20 of the FIG. 3.

Continuing in the description of the display 20 of the FIG. 3, a plus symbol 207 represents a current geographical location entered through the keypad 12 or received through the I/O interface 14 from the location apparatus 26. A direction indication 208 shows that North is in the upward direction on the display 20. A scale indicator 210 shows a scale of sixteen meters for the distance shown by the scale line. A battery indicator 212 shows that the data recorder 10 is being powered by a battery and that the battery is almost fully charged. The product identifier 214 shows that the location apparatus 26 is a Model 4400 with a radio interface. The Model 4400 GPS survey receiver, the radio interface for receiving GPS location information from a reference station, and the reference station are commercially available from Trimble Navigation Limited of Sunnyvale, Calif. Display characters 216 indicate that the location apparatus 26 is operating in a real time kinematic survey mode. A circled seven 217 indicates that the GPS signal from seven GPS satellites is being processed by the GPS survey receiver for determining the geographical location. Display PDOP characters 218 indicate that the geometry of the GPS satellites has a positional dilution of precision of 1.8 for the GPS-based location. In and out key identifiers 220 identify softkeys on the keypad 12 for zooming in and out for changing the scale of the display 20. A filter key identifier 222 identifies a softkey on the keypad 12 for filtering a feature code so that icons for the features have that feature code are not shown on the display 20. A here key identifier 224 identifies a softkey on the keypad 12 for panning geographical location shown by the display 20. An options key identifier 226 identifies a softkey on the keypad 12 for enabling the operator to select from several alternatives shown in tables 1 and 2.

Figure 4:
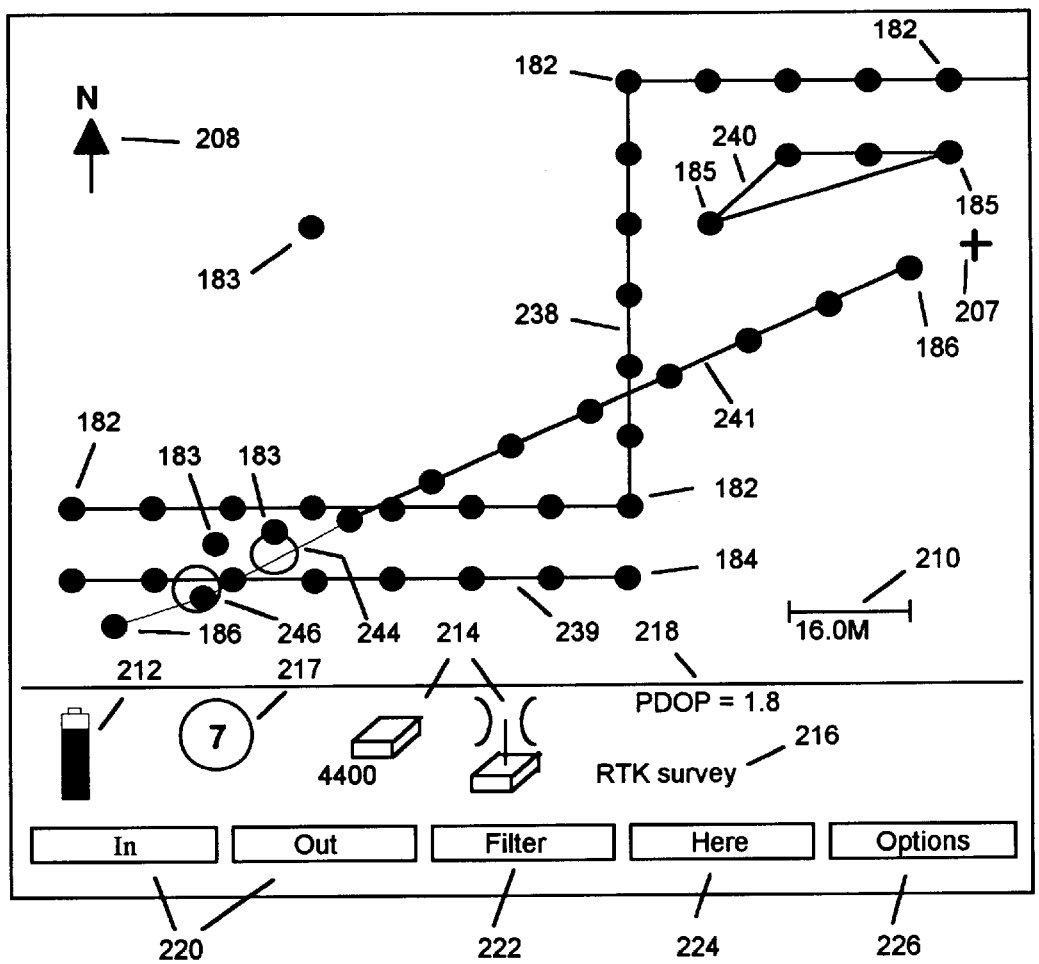
FIG. 4 is a diagram of a display of the present invention having connecting lines for the data recorder of FIG. 1.

FIG. 4 is a drawing of the display 20 where the elements having reference numbers 182–226 are as described in the description accompanying FIG. 3, above. The FIG. 4 shows the display 20 where the line update program 28 draws a line 238 connecting icons 182, a line 239 connecting the icons 184, a line 240 connecting the icons 185 in a closed loop, and a line 241 connecting the icons 186. The icons 183 are not connected. It may be noted that it is easier for the operator to distinguish one group of features from another using the display 20 in the FIG. 4 than the display 20 in the FIG. 3. Further, it is more easily observable that a feature in the line 241 is likely to have been missed in an area 244 and another feature in the line 241 is likely to be located incorrectly in an area 246. The method and apparatus of the present invention enables the operator to check the features of the areas 244 and 246 while still in the field.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method in a portable data recorder for displaying geographical map features in real-time as they are recorded, comprising steps of:

traveling to a first feature having a first location;

determining said first location;

recording said first feature with a first code and said first location;

traveling to a second feature having a second location;

determining said second location;

recording said second feature with a second code and said second location; and while at said second feature, automatically displaying a line on a map display between a first display point representative of said first location and a second display point representative of said second location when said first code and said second code are the same.

2. The method of claim 1, further comprising steps of:

while at said first feature, automatically searching a data memory for a record of a previous feature recorded at a previous time with a previous code and a previous location and automatically displaying a line on said map display between said first display point and a display point representative of said previous location when said first code and said previous code are the same.

3. The method of claim 2, wherein:

the step of recording said first feature includes a step of recording a start indication when said first feature is a start of a sequence; and the step of searching said data memory includes a step of searching said data memory only when said start indication is not recorded for said first feature.

4. The method of claim 1, wherein:

the step recording said first feature includes a step of recording a skip indication when said first feature is an end of a sequence; and the step of displaying said line includes a step of displaying said line while at said second feature and only when said skip indication is not recorded for first feature.

5. The method of claim 1, further comprising steps of:

while at said second feature, when said second code and said first code are not the same, automatically searching a data memory for a record of a previous feature recorded with a previous code and a previous location and automatically displaying a line on said map display directly between said second display point and a display point representative of said previous location when said second code and said previous code are the same.

6. The method of claim 1, wherein:

the step of determining said first location includes steps of receiving a global positioning system (GPS) signal, receiving a radio signal from a GPS reference station, and determining said first location by processing said GPS signal together with said radio signal.

7. A data recorder for recording and displaying geographical map features, comprising:

a user entry device for receiving information for recording a first feature with a first feature code and a first geographical location and then a second feature with a second feature code and a second geographical location;

a map display; and a line update program coupled to the user entry device and the map display for operating in real-time as said second feature is recorded for causing the map display for automatically displaying a line between a first display point representative of said first location and a second display point representative of said second location when said first code and said second code are the same.

8. The data recorder of claim 7, further comprising:

a data memory for storing a previous recording of a previous feature with a previous feature code and a previous geographical location; and wherein:

the line update program is coupled to the data memory for searching for said previous record and automatically displaying a line on said map display between said first display point and a display point representative of said previous location when said first code and said previous code are the same.

9. The data recorder of claim 8, wherein:

the user entry is further for receiving a start indication for said first feature when said first feature is a start of a sequence; and the line update program is further for searching for said previous record only when said sequence start indication has not been received for said first feature.

10. The data recorder of claim 7, wherein:

the user entry device is further for receiving a skip indication for said first feature when said first feature is an end of a sequence; and the line update program is further for causing the display for displaying said line only when said skip indication is not received for said first feature.

11. The data recorder of claim 7, further including:

a data memory for storing a previous recording of a previous feature with a previous feature code and a previous geographical location; and wherein:

the line update program is coupled to the data memory for searching for said previous recording and automatically displaying a line on said map display directly between said second display point and a display point representative of said previous location only when said first code and said second code are not the same and said second code and said previous code are the same.

12. The data recorder of claim 7, wherein:

the user entry device includes an I/O interface for receiving said first geographical location; and said first geographical location is determined by a global positioning system (GPS) surveyor apparatus for receiving a global positioning system (GPS) signal, receiving a radio signal from a GPS reference station, and determining said first location by processing said GPS signal together with said radio signal.

13. A date recorder for recording and displaying geographical map features, comprising:

a user entry device for receiving geographical locations and associated respective codes, said codes for identifying features, respectively;

an options key coupled with the user entry device for receiving a selection of a line option; and a map display coupled to the user entry device for displaying icons at points representative of said geographical locations and for selectively displaying a connecting line between said points in real-time as said codes are received when said codes are the same and said selection of said line option is received.

14. The data recorder of claim 13, wherein:

the user entry device further includes a zoom in key for selecting a new scale of the map display and causing said icons and said connecting line to be displayed to said new scale and a here key for causing the map display to pan to a new geographical location causing said icons to move to new points corresponding to said new geographical locations.

* * * * *